United States Patent
Baba (10) Patent No.: US 9,069,154 B2
(45) Date of Patent: Jun. 30, 2015

(54) PROJECTION LENS AND PROJECTION TYPE DISPLAY DEVICE

(71) Applicant: FUJIFILM Corporation, Tokyo (JP)

(72) Inventor: Tomoyuki Baba, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/246,474

(22) Filed: Apr. 7, 2014

(65) Prior Publication Data
US 2014/0307328 A1   Oct. 16, 2014

(30) Foreign Application Priority Data

Apr. 12, 2013   (JP) .................................. 2013-083662

(51) Int. Cl.
| | |
|---|---|
| G02B 3/00 | (2006.01) |
| G02B 13/00 | (2006.01) |
| G02B 13/16 | (2006.01) |
| G02B 13/18 | (2006.01) |

(52) U.S. Cl.
CPC ............ *G02B 13/0045* (2013.01); *G02B 13/16* (2013.01); *G02B 13/18* (2013.01)

(58) Field of Classification Search
CPC ....................................................... G02B 13/16
USPC ................................................... 359/649–651
See application file for complete search history.

(56) References Cited

U.S. PATENT DOCUMENTS

| | | | |
|---|---|---|---|
| 7,123,426 B2 * | 10/2006 | Lu et al. ........................ | 359/750 |
| 7,184,219 B2 | 2/2007 | Kobayashi | |
| 7,924,508 B2 | 4/2011 | Wang et al. | |
| 7,952,817 B2 | 5/2011 | Kang et al. | |
| 2012/0262803 A1 | 10/2012 | Matsuo | |

FOREIGN PATENT DOCUMENTS

| | | |
|---|---|---|
| JP | 2010-271664 | 12/2010 |
| JP | 4683944 | 5/2011 |

* cited by examiner

*Primary Examiner* — William Choi (74) *Attorney, Agent, or Firm* — Young & Thompson (57) ABSTRACT

When a single lens which includes a surface having the smallest effective beam diameter or a cemented lens is designated as a reference lens, a system substantially consisting of lenses disposed closer to a magnification side than the reference lens is designated as a front group, and a system substantially consisting of lenses disposed closer to a reduction side than the reference lens is designated as a rear group, the projection lens satisfying conditional expressions (1) and (2) given below as well as conditional expressions (3) and (4): $75<2\omega$ (1), $\beta P<10$ (2), $|fM/fF|<2.0$ (3), and $|fM/fR|<2.0$ (4).

11 Claims, 7 Drawing Sheets

EXAMPLE 1

FIG.1

EXAMPLE 1

FIG.7

PROJECTION LENS AND PROJECTION TYPE DISPLAY DEVICE

BACKGROUND OF THE INVENTION

1. Field of the Invention

The present invention relates to a projection lens and a projection type display device, and for example, to a projection lens and a projection type display device which can be preferably used for enlarging and projecting beams that carries video information from a light valve on a screen and which can be configured to have a wide angle and to be compact.

2. Description of the Related Art

Conventionally, projection type projector devices (projection type display devices) that utilize a light valve, such as liquid crystal display elements, DMD's (Digital Micromirror Device: registered trademark), or the like, have been commonly available. In recent years, presentations using such projection type display devices have been popularly performed as a result of the rapid progress of miniaturization and high definition of light valves as well as the spread of personal computers. Under these circumstances, the demand for compact projection type display devices which have a wide angle and superior portability while having favorable projection performance is increasing, and accordingly projection lenses are being expected to be configured to have wide angles and be compact while achieving favorable correction of various aberrations. With increasing competition in development, more cost reduction is becoming strongly desired, in addition to the above demands.

Known projection lenses having a wide angle and a compact configuration, which can be used for the projection type display devices, include the lens systems as disclosed in Japanese Unexamined Patent Publication No. 2010-271664, Japanese Patent No. 4683944, U.S. Pat. No. 7,952,817, U.S. Pat. No. 7,924,508, U.S. Patent Application No. 20120262803, and U.S. Pat. No. 7,184,219, for example.

SUMMARY OF THE INVENTION

However, none of the projection lenses disclosed in Japanese Unexamined Patent Publication No. 2010-271664, Japanese Patent No. 4683944, U.S. Pat. No. 7,952,817, U.S. Pat. No. 7,924,508, U.S. Patent Application No. 20120262803, and U.S. Pat. No. 7,184,219, described above, has sufficient characteristics with respect to various aberrations, and accordingly, projection lenses having higher performance are in demand.

The present invention has been developed in view of the above circumstances, and it is an object of the present invention to provide a low cost and compact projection lens with a wide angle and satisfactory characteristics with respect to various aberrations, and a projection type display device including the projection lens.

A projection lens of the present invention projects image information displayed at a reduction-side conjugate position onto a magnification-side conjugate position, satisfies the following conditional expressions (1) and (2), and satisfies the following conditional expressions (3) and (4) when a single lens which includes a surface having the smallest effective beam diameter or a cemented lens is designated as a reference lens, a system substantially consisting of lenses disposed closer to a magnification-side than the reference lens is designated as a front group (not including the reference lens), and a system substantially consisting of lenses disposed closer to a reduction side than the reference lens is designated as a rear group (including the reference lens):

$$75 < 2\omega \quad (1)$$

$$\beta P < 10 \quad (2)$$

$$|fM/fF| < 2.0 \quad (3), \text{ and}$$

$$|fM/fR| < 2.0 \quad (4),$$

where
$\omega$ is a half angle of view of the projection lens, $\beta P$ is a pupil magnification (a reduction-side pupil diameter/a magnification-side pupil diameter), fM is the focal length of the reference lens, fF is the focal length of the front group, and fR is the focal length of the rear group.

It is preferable for the projection lens of the present invention to satisfy conditional expression (5) given below:

$$|f/fM| < 0.5 \quad (5),$$

where
f is the focal length of the entire projection lens system.

Further, it is preferable for the projection lens to satisfy conditional expression (6) given below:

$$0.7 < hM/f \quad (6),$$

where
hM is the effective beam diameter of a surface having the smallest effective beam diameter, and f is the focal length of the entire projection lens system.

Further, it is preferable for the front group to have at least one aspheric surface.

It is preferable for the reference lens to have a negative refractive power.

It is preferable for the rear group to have at least one aspheric surface.

It is also preferable for the rear group to substantially consist of a negative lens, at least one positive lens, and a cemented lens composed by a negative lens and a positive lens, in this order from the magnification side.

Further, it is preferable for the projection lens to satisfy conditional expressions (1-1) and (2-1) given below:

$$100 < 2\omega \quad (1\text{-}1), \text{ and}$$

$$\beta P < 7.5 \quad (2\text{-}1).$$

Further, it is preferable for the projection lens to satisfy conditional expressions (3-1) and (4-1) given below:

$$|fM/fF| < 1.5 \quad (3\text{-}1), \text{ and}$$

$$|fM/fR| < 1.5 \quad (4\text{-}1).$$

Further, it is preferable for the projection lens to satisfy conditional expression (6-1) given below:

$$1.0 < hM/f \quad (6\text{-}1)$$

A projection type display device of the present invention includes a light source; a light valve which light from the light source enters; and the above projection lens of the present invention that is a projection lens which projects optical images generated by the light modulated by the light valve onto a screen.

Note that the above expression "substantially consists of" intends to mean that the projection lens may include lenses substantially without any refractive power; optical elements other than lenses such as apertures, masks, glass covers, and filters; and mechanical components such as lens flanges, lens barrels, imaging elements, and camera shake correction mechanisms; in addition to the lens groups which are listed as constituent elements.

Signs of surface shapes and refractive powers of the above lenses should be considered in a paraxial region if aspheric surfaces are included therein.

The projection lens of the present invention projects image information displayed at a reduction-side conjugate position onto a magnification-side conjugate position, satisfies the following conditional expressions (1) and (2), and satisfies the following conditional expressions (3) and (4) when a single lens which includes a surface having the smallest effective beam diameter or a cemented lens is designated as a reference lens, a system substantially consisting of lenses disposed closer to a magnification-side than the reference lens is designated as a front group (not including the reference lens), and a system substantially consisting of lenses disposed closer to a reduction side than the reference lens is designated as a rear group (including the reference lens):

$$75 < 2\omega \qquad (1)$$

$$\beta P < 10 \qquad (2)$$

$$|fM/fF| < 2.0 \qquad (3), \text{ and}$$

$$|fM/fR| < 2.0 \qquad (4).$$

This enables a low cost and compact projection lens having a wide angle and satisfactory characteristics of various aberrations to be realized.

Moreover, the projection type display device of the present invention applies the projection lens of the present invention, which enables the device to be configured to have favorable projection performance and a wide angle and to achieve a compact size and cost reduction.

DESCRIPTION OF THE PREFERRED EMBODIMENTS

Figure 1:
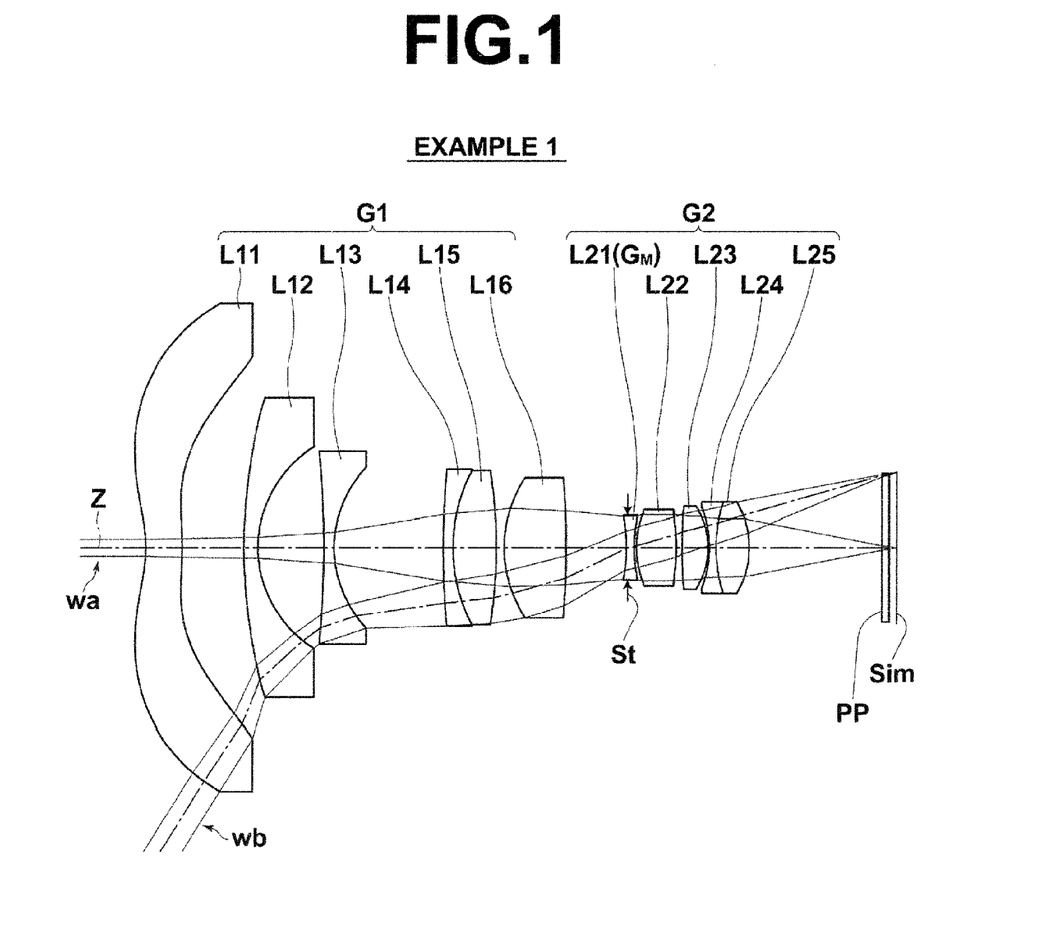
FIG. 1 is a cross-sectional view of a projection lens (corresponding to Example 1) according to one embodiment of the present invention, illustrating the lens configuration thereof.

Hereinafter, embodiments of the present invention will be described in detail with reference to the accompanying drawings. FIG. 1 is a cross-sectional view of a projection lens (corresponding to Example 1) according to one embodiment of the present invention, illustrating the lens configuration thereof. The configuration example illustrated in FIG. 1 corresponds to the configuration of the projection lens of Example 1 to be described later. Note that FIG. 1 collectively shows an on-axis beam wa and a beam wb with a maximum angle of view.

This projection lens can be used as a projection lens, which is mounted, for example, on a projection type display device, and which projects image information displayed on a light valve onto a screen. In FIG. 1, the left side of the diagram is designated as a magnification side, and the right side thereof is designated as a reduction side. Further, supposing a case that the projection lens is mounted on the projection type display devices, a parallel plate optical member PP which is assumed to be various types of filters, a cover glass, and the like; an image display surface Sim of the light valve; and an aperture stop St are collectively shown in the Figure. Note that the aperture stop St shown in FIG. 1 does not necessarily represent the size or shape thereof, but represents the position thereof on the optical axis Z.

In the projection type display device, a beam which has obtained the image information on the image display surface Sim enters the projection lens via the optical member PP, and the projection lens projects the beam onto the screen (not shown) disposed toward the left side direction of the drawing sheet.

Note that although FIG. 1 shows only one image display surface Sim, the projection type display device may be configured to separate the beam from the light source into the three primary colors by a color separation optical system, to be provided with three light valves which respectively correspond to the three primary colors, and to enable display of full color images.

The projection lens according to the present embodiment satisfies conditional expressions (1) and (2) given below as well as conditional expressions (3) and (4), when a single lens which includes a surface having the smallest effective beam diameter or a cemented lens is designated as a reference lens GM (which is lens L21 in the present embodiment), a system substantially consisting of lenses disposed closer to a magnification-side than the reference lens L21 (GM) is designated as a front group G1 (not including the reference lens L21 (GM)), and a system substantially consisting of lenses disposed closer to a reduction side than the reference lens L21 (GM) is designated as a rear group G2 (including the reference lens L21 (GM)):

$$75 < 2\omega \qquad (1)$$

$$\beta P < 10 \qquad (2)$$

$$|fM/fF| < 2.0 \qquad (3), \text{ and}$$

$$|fM/fR| < 2.0 \qquad (4),$$

where
ω is a half angle of view of the projection lens, βP is a pupil magnification (a reduction-side pupil diameter/a magnification-side pupil diameter), fM is the focal length of the reference lens, fF is the focal length of the front group, and fR is the focal length of the rear group.

If the projection lens satisfies conditional expression (1), sufficient wide angle performance can be obtained. Further, if the projection lens satisfies conditional expression (2), the projection light from the image display element can be converged (non-telecentric), which particularly enables size and weight reduction of the rear group G2m, thereby achieving low cost.

Further, if the projection lens satisfies conditional expression (3), the power of the front group G1 can be prevented from increasing excessively, which enables favorable correction of various aberrations such as distortion, field curvature, and the like in particular. If the projection lens satisfies conditional expression (4), the power of the rear group G2 can be prevented from increasing excessively, which enables favorable correction of spherical aberration, field curvature, and the like in particular.

Note that if the projection lens satisfies conditional expressions (1-1) and (2-1) given below, size, weight, and cost reduction can be further achieved:

$$100<2\omega \quad (1\text{-}1), \text{ and}$$

$$\beta P<7.5 \quad (2\text{-}1).$$

Further, if the projection lens satisfies conditional expressions (3-1) and (4-1) given below, more satisfactory characteristics can be obtained:

$$|fM/fF|<1.5 \quad (3\text{-}1), \text{ and}$$

$$|fM/fR|<1.5 \quad (4\text{-}1).$$

It is preferable for the projection lens of the present invention to satisfy conditional expression (5) given below. If the projection lens satisfies conditional expression (5), the power of the reference lens L21 (GM) can be prevented from increasing excessively, which enables favorable correction of various aberrations such as spherical aberration and the like in particular.

$$|f/fM|<0.5 \quad (5),$$

where
f is the focal length of the entire projection lens system.

Further, it is preferable for the projection lens to satisfy conditional expression (6) given below. If the projection lens satisfies conditional expression (6), an angle of field can be wider without reducing the F-value. Note that if the projection lens satisfies conditional expression (6-1) given below, more favorable characteristics can be obtained.

$$0.7<hM/f \quad (6), \text{ and}$$

$$1.0<hM/f \quad (6\text{-}1),$$

where
hM is the effective beam diameter of a surface having the smallest effective beam diameter, and f is the focal length of the entire projection lens system.

It is preferable for the front group G1 to have at least one aspheric surface. By configuring the lens in such a manner, distortions can be satisfactorily corrected.

It is preferable for the reference lens L21 (GM) to have a negative refractive power. By configuring the lens in such a manner, the entire balance can be satisfactorily maintained and spherical aberrations can be favorably corrected.

Further, it is preferable for the rear group to have at least one aspheric surface. By configuring the lens in such a manner, spherical aberrations and field curvature can be favorably corrected.

Further, it is preferable for the rear group to substantially consist of a negative lens, at least one positive lens, and a cemented lens composed of a negative lens and a positive lens, in this order from the magnification side. By configuring the lens in such a manner, spherical aberrations and field curvature can be favorably corrected. Further, if the above cemented lens is disposed in the most reduction side, the balance of axial chromatic aberrations can be favorably maintained.

Figure 4:
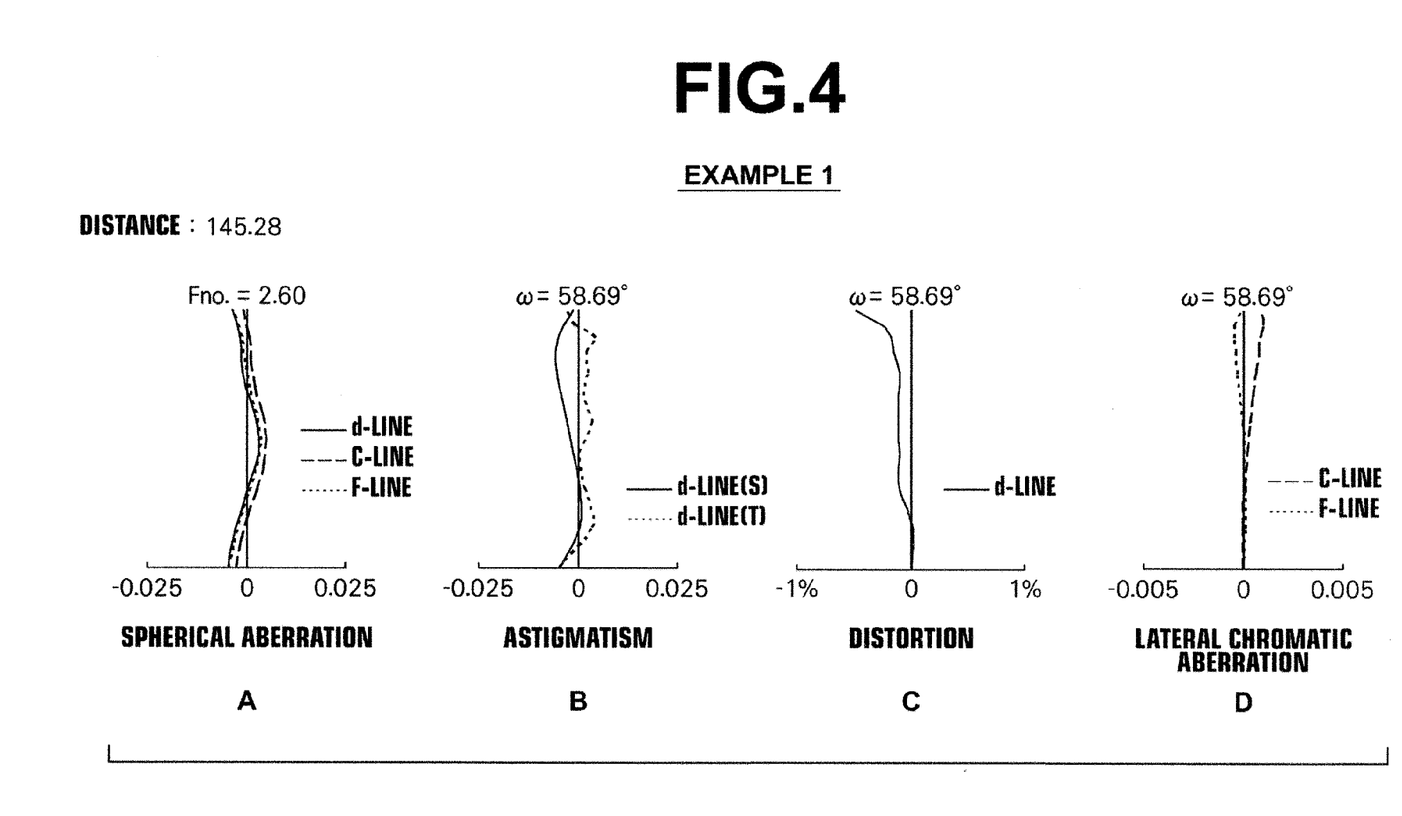
FIG. 4 shows aberration diagrams A to D of the projection lens according to Example 1 of the present invention.
Figure 5:
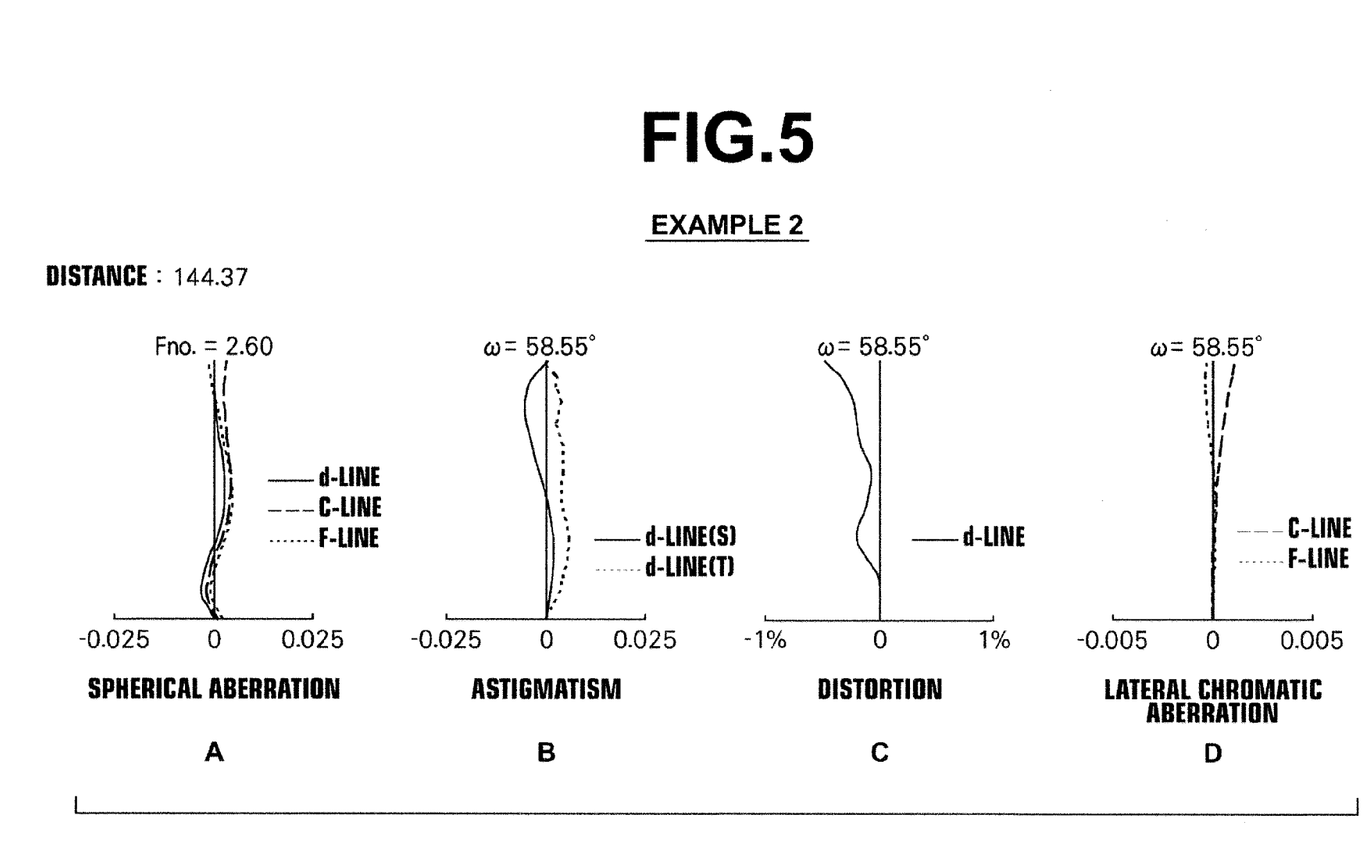
FIG. 5 shows aberration diagrams A to D of the projection lens according to Example 2 of the present invention.
Figure 6:
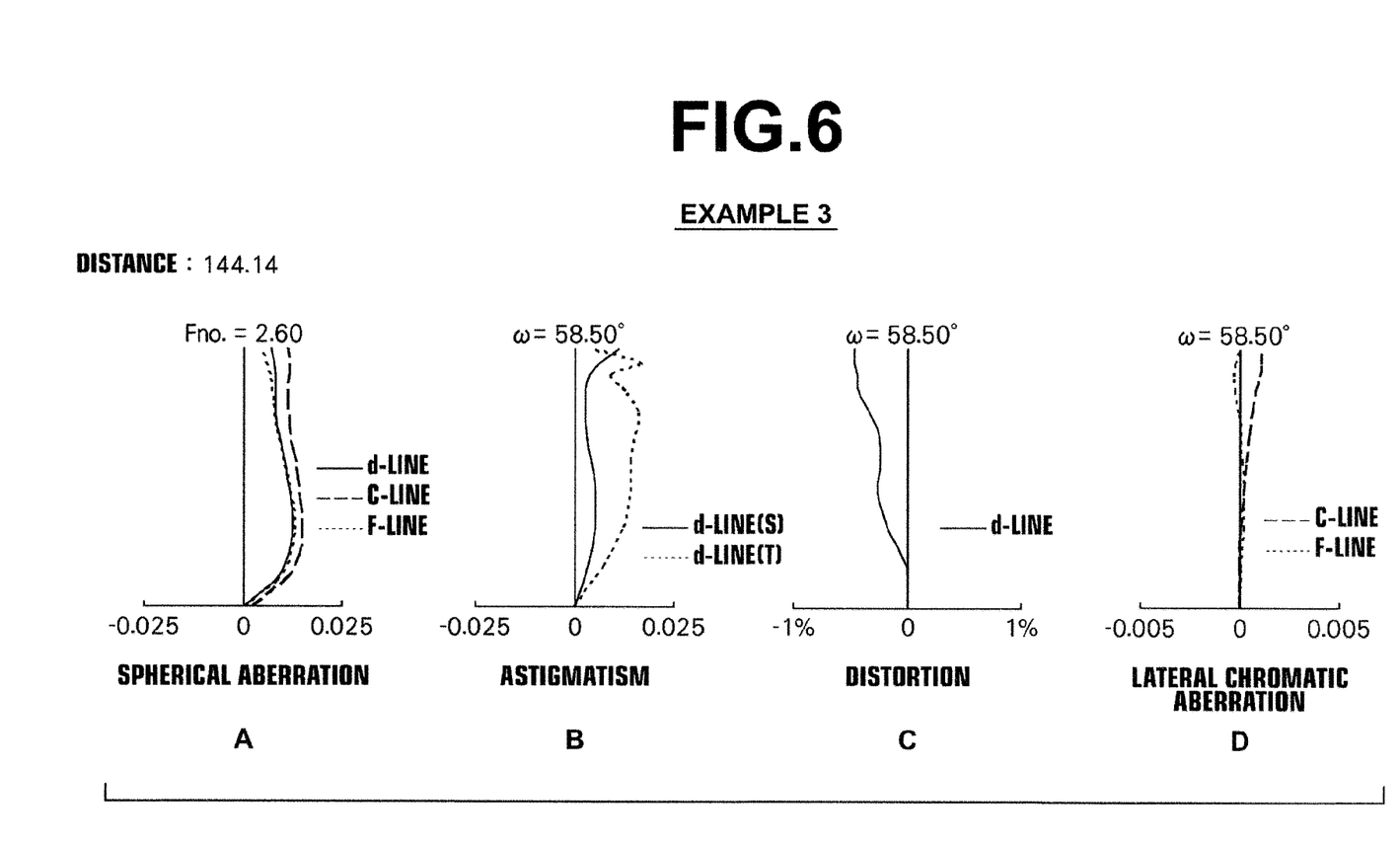
FIG. 6 shows aberration diagrams A to D of the projection lens according to Example 3 of the present invention.

Next, numerical values of Examples of the projection lens of the present invention will be described. Note that the numerical values shown in the following Tables 1 through 10 and the aberration diagrams of FIGS. 4 through 6 are standardized such that the focal length of the entire system at the time of focusing on an object at infinity is 1.0.

First, the projection lens of Example 1 will be described. A cross-sectional view of the projection lens of Example 1, illustrating the lens configuration thereof, is shown in FIG. 1. In this case, in FIG. 1 and FIGS. 2 and 3 corresponding to Examples 2 and 3, respectively to be described later, the optical member PP, the image display surface Sim, and the aperture stop St are collectively shown. Further, the left side of the drawing is designated as a magnification side and the right side thereof is designated as a reduction side. The aperture stop St does not necessarily represent a size or shape thereof, but represents a position on the optical axis Z.

Table 1 shows basic lens data of the projection lens of Example 1, and Table 2 shows data regarding specs. The following are descriptions of the meanings of the items in the Tables with reference to Example 1. The same applies to Examples 2 and 3.

In the lens data of Table 1, item Si represents the i-th (i=1, 2, 3, ...) surface number, the value of i sequentially increasing from the surface of the constituent element at the most-magnification side, which is designated as 1, toward the reduction side. Item Ri represents the radius of curvature of the i-th surface (i=1, 2, 3, ...), and item Di represents the distance between the i-th surface and an (i+1)st surface along the optical axis Z1. Further, item Nj represents the refractive index of a j-th (j=1, 2, 3, ...) optical element with respect to the d-line (wavelength: 587.6 nm), the value of j sequentially increasing from the optical element at the most magnification side, which is designated as 1, toward the reduction side. Item vdj represents the Abbe number of the j-th optical element with respect to the d-line (wavelength: 587.6 nm). Further, item EAi represents the effective beam diameter of the i-th surface.

Note that the sign of the radius of curvature is positive in the case that a surface shape is convex on the magnification side, and negative in the case that the surface shape is convex on the reduction side. The basic lens data shows the aperture stop St and an optical member PP as well. The term "aperture stop" is indicated in the column of the surface number of a surface which corresponds to the aperture stop St together with the surface number thereof.

The data regarding specs of Table 2 represents values of the focal length f', the back focus BF', F-value FNo., and a total angle of view 2ω.

In the basic lens data and data regarding specs, degrees are used as the unit for angles, but the other items are standardized, and therefore no units are indicated.

In the lens data of Table 1, the mark "*" is indicated at surface numbers of aspheric surfaces. Numerical values of paraxial radii of curvature are indicated as the radii of curvature of the aspheric surfaces. The data regarding the aspheric coefficient of Table 3 shows surface numbers Si of aspheric surfaces and aspheric surface coefficients regarding these aspheric surfaces. The aspheric coefficient is a value of each coefficient Ka, Am (m=3, 4, 5, ... 20) in formula (A) below, which is an aspheric surface formula:

$$Zd=C \cdot h^2/\{1+(1-KA \cdot C^2 \cdot h^2)^{1/2}\}+\Sigma Am \cdot h^m \quad (A)$$

where,
Zd: the depth of an aspheric surface (the length of a perpendicular line drawn from a point on an aspheric surface with a height h to a plane perpendicular to the optical axis which contacts the peak of the aspheric surface)

h: height (the distance from the optical axis)
C: the reciprocal of a paraxial radius of curvature
KA, AM: aspheric surface coefficients (m=3, 4, 5, . . . 20)

TABLE 1

Example 1 • Lens Data

| Si (Surface Number) | Ri (Radius of Curvature) | Di (Surface Distance) | Ndj (Refractive Index) | vdj (Abbe Number) | EAi (Effective Beam Diameter) |
|---|---|---|---|---|---|
| *1 | −2.44098 | 0.77569 | 1.49100 | 57.58 | 10.68 |
| *2 | −4.85512 | 1.32676 | | | 8.37 |
| 3 | 12.10841 | 0.30508 | 1.70154 | 41.24 | 6.55 |
| 4 | 2.62359 | 1.41985 | | | 4.40 |
| 5 | −22.05826 | 0.21791 | 1.63854 | 55.38 | 4.22 |
| 6 | 2.59521 | 2.35583 | | | 3.52 |
| 7 | 18.59076 | 0.21791 | 1.63854 | 55.38 | 3.43 |
| 8 | 3.74506 | 0.92779 | 1.62004 | 36.26 | 3.37 |
| 9 | −11.16012 | 0.16458 | | | 3.33 |
| 10 | 2.84425 | 1.33490 | 1.51742 | 52.43 | 3.07 |
| 11 | −17.73845 | 1.32266 | | | 2.53 |
| 12 (Aperture Stop) | ∞ | −0.02427 | | | 1.36 |
| 13 | −3.78119 | 0.17433 | 1.83481 | 42.73 | 1.37 |
| 14 | 3.92501 | 0.04051 | | | 1.42 |
| *15 | 2.02802 | 0.85383 | 1.58313 | 59.46 | 1.53 |
| *16 | −3.34950 | 0.12224 | | | 1.67 |
| 17 | 11.93112 | 0.56269 | 1.49700 | 81.54 | 1.76 |
| 18 | −1.68391 | 0.02906 | | | 1.81 |
| 19 | −2.40500 | 0.14528 | 1.83400 | 37.16 | 1.77 |
| 20 | 3.27349 | 0.71334 | 1.49700 | 81.54 | 1.86 |
| 21 | −1.97444 | 2.86089 | | | 1.99 |
| 22 | ∞ | 0.15254 | 1.51633 | 64.14 | 3.21 |
| 23 | ∞ | 0.16194 | | | 3.25 |

TABLE 2

Example 1 • Specs (d-line)

| | |
|---|---|
| f | 1.00 |
| Bf | 3.11 |
| FNo. | 2.60 |
| 2ω [°] | 117.38 |

TABLE 3

Example 1 • Aspherical Surface Coefficient

| | Surface Number | | | |
|---|---|---|---|---|
| | 1 | 2 | 15 | 16 |
| KA | 0.0000000E+00 | 0.0000000E+00 | 7.0243215E−01 | −1.8201517E+00 |
| A3 | 7.1321304E−02 | 7.6068846E−02 | 0.0000000E+00 | 0.0000000E+00 |
| A4 | 1.8140593E−02 | −1.3803933E−03 | −7.0437671E−03 | 5.8478488E−02 |
| A5 | −1.3147468E−02 | −3.4702252E−04 | 0.0000000E+00 | 0.0000000E+00 |
| A6 | 2.1752550E−03 | −4.3248893E−04 | −8.8449961E−03 | 1.0772767E−02 |
| A7 | 8.1168490E−05 | −5.2333240E−05 | 0.0000000E+00 | 0.0000000E+00 |
| A8 | −2.8798139E−05 | 1.0248983E−05 | 1.2311124E−01 | −1.9305377E−02 |
| A9 | −5.4268586E−06 | 3.6093829E−06 | 0.0000000E+00 | 0.0000000E+00 |
| A10 | 6.5145410E−08 | 1.0013731E−06 | −2.7055496E−01 | 3.5913920E−01 |
| A11 | 1.4343865E−07 | −7.8314341E−08 | 0.0000000E+00 | 0.0000000E+00 |
| A12 | 2.2322755E−08 | −1.4918061E−08 | 2.2131035E−01 | −9.8338222E−01 |
| A13 | 4.7702575E−09 | −6.1969020E−09 | 0.0000000E+00 | 0.0000000E+00 |
| A14 | −2.6524152E−09 | 3.6199429E−10 | 1.3981770E−02 | 1.1313234E+00 |
| A15 | 2.9538462E−10 | −1.4834477E−09 | 0.0000000E+00 | 0.0000000E+00 |
| A16 | −4.2987997E−11 | 1.7882098E−10 | −8.2294199E−02 | −4.8463311E−01 |
| A17 | 7.8571347E−13 | 2.4340040E−11 | 0.0000000E+00 | 0.0000000E+00 |
| A18 | 3.4514891E−13 | 4.9399940E−12 | 0.0000000E+00 | 0.0000000E+00 |
| A19 | 2.4449731E−13 | 7.3225666E−13 | 0.0000000E+00 | 0.0000000E+00 |
| A20 | −3.3445492E−14 | −3.5979861E−13 | 0.0000000E+00 | 0.0000000E+00 |

A through D of FIG. 4 are aberration diagrams of the projection lens of Example 1. A through D of FIG. 4 show spherical aberration, astigmatism, distortion, and lateral chromatic aberration, respectively.

Aberration diagrams, which respectively show spherical aberration, astigmatism, and distortion illustrate aberration employing the d-line (wavelength: 587.6 nm) as a reference wavelength. Each of the spherical aberration diagrams shows aberration with respect to the d-line (wavelength: 587.6 nm) with a solid line, aberration with respect to the C-line (wavelength: 656.3 nm) with a broken line, and aberration with respect to the F-line (wavelength: 486.1 nm) with a dotted line. The astigmatism diagram shows aberration in a sagittal direction with a solid line, and aberration in a tangential direction with a dotted line. The lateral chromatic aberration diagram shows aberration with respect to the C-line (wavelength: 656.3 nm) with a broken line, and aberration with respect to the F-line (wavelength: 486.1 nm) with a dotted line. Note that Fno. of the spherical aberration diagram refers to F-value, and ω of the other aberration diagrams refers to a half angle of view.

Figure 2:
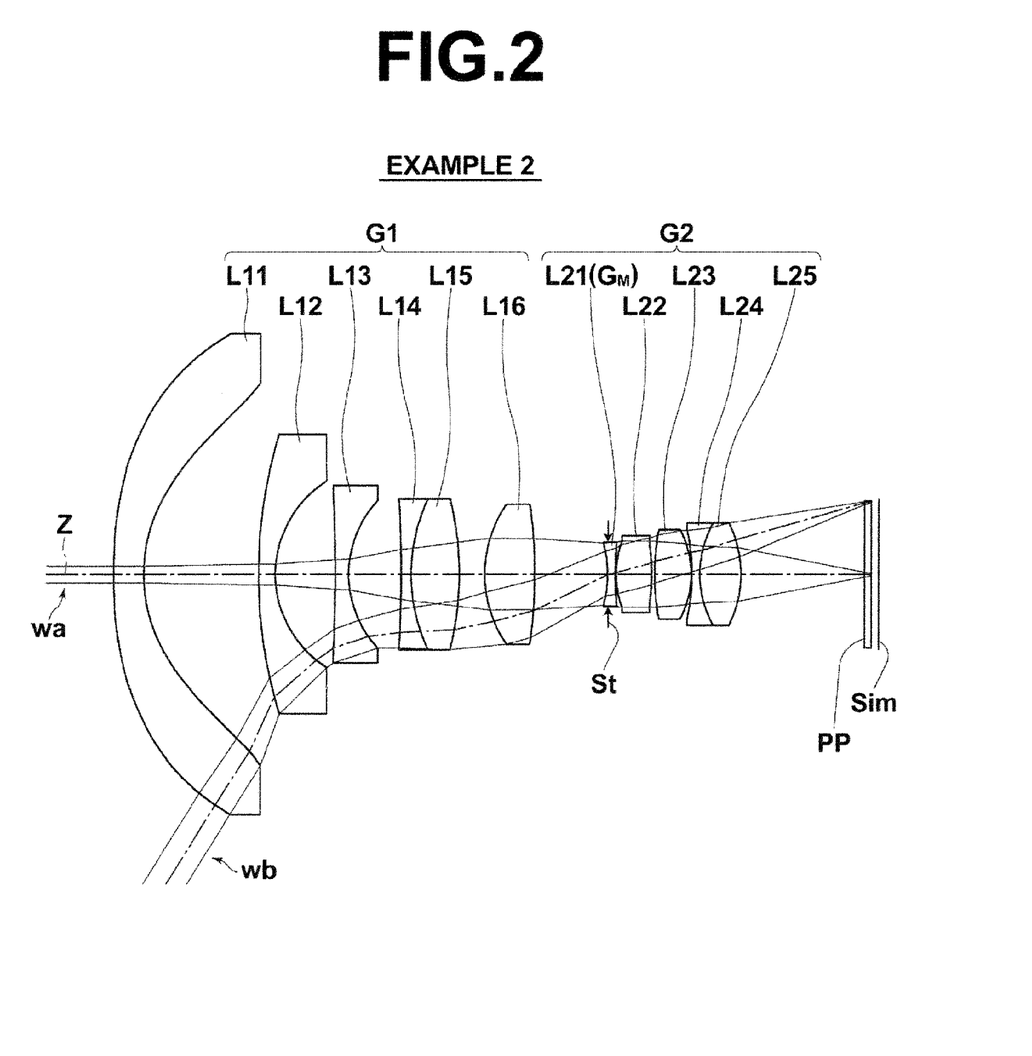
FIG. 2 is a cross-sectional view of a projection lens according to Example 2 of the present invention, illustrating the lens configuration thereof.

Next, a projection lens of Example 2 will be described. FIG. 2 shows a cross-sectional view of the projection lens according to Example 2, illustrating the lens configuration thereof.

Table 4 shows basic lens data of a projection lens of Example 2, Table 5 shows data regarding specs, Table 6 shows data regarding aspheric surface coefficients, and A through D of FIG. 5 respectively are aberration diagrams.

TABLE 4

Example 2 • Lens Data

| Si (Surface Number) | Ri (Radius of Curvature) | Di (Surface Distance) | Ndj (Refractive Index) | vdj (Abbe Number) | EAi (Effective Beam Diameter) |
|---|---|---|---|---|---|
| *1 | 38.14693 | 0.64968 | 1.49100 | 57.58 | 10.58 |
| *2 | 4.50858 | 2.50127 | | | 8.42 |
| 3 | 10.76946 | 0.36093 | 1.70154 | 41.24 | 6.16 |
| 4 | 2.46601 | 1.29356 | | | 4.12 |

TABLE 4-continued

Example 2 • Lens Data

| Si (Surface Number) | Ri (Radius of Curvature) | Di (Surface Distance) | Ndj (Refractive Index) | vdj (Abbe Number) | EAi (Effective Beam Diameter) |
|---|---|---|---|---|---|
| 5 | −42.47067 | 0.28875 | 1.71299 | 53.87 | 3.91 |
| 6 | 2.39229 | 1.14890 | | | 3.25 |
| 7 | −28.08290 | 0.21806 | 1.61800 | 63.33 | 3.26 |
| 8 | 4.01728 | 1.03428 | 1.62004 | 36.26 | 3.30 |
| 9 | −7.01761 | 0.55380 | | | 3.33 |
| 10 | 2.75230 | 1.08798 | 1.51742 | 52.43 | 3.08 |
| 11 | −11.14242 | 1.59509 | | | 2.78 |
| 12 (Aperture Stop) | ∞ | −0.01205 | | | 1.35 |
| 13 | −2.80604 | 0.17325 | 1.83481 | 42.73 | 1.36 |
| 14 | 11.16702 | 0.01444 | | | 1.41 |
| *15 | 2.36575 | 0.76438 | 1.58313 | 59.38 | 1.46 |
| *16 | −4.08444 | 0.06818 | | | 1.69 |
| 17 | 5.55392 | 0.78877 | 1.49700 | 81.54 | 1.82 |
| 18 | −2.08348 | 0.01445 | | | 1.97 |
| 19 | −4.56227 | 0.17325 | 1.83400 | 37.16 | 1.96 |
| 20 | 2.35027 | 0.89746 | 1.49700 | 81.54 | 2.05 |
| 21 | −2.50220 | 2.67669 | | | 2.25 |
| 22 | ∞ | 0.15159 | 1.51633 | 64.14 | 3.21 |
| 23 | ∞ | 0.16021 | | | 3.24 |

TABLE 5

Example 2 • Specs (d-line)

| | |
|---|---|
| f′ | 1.00 |
| Bf′ | 2.93 |
| FNo. | 2.60 |
| 2ω [°] | 117.10 |

TABLE 6

Example 2 • Aspherical Surface Coefficient

| | Surface Number | | | |
|---|---|---|---|---|
| | 1 | 2 | 15 | 16 |
| KA | 0.0000000E+00 | 0.0000000E+00 | −2.6825179E+00 | −1.1644172E+01 |
| A3 | 2.7394133E−02 | 3.3118550E−02 | 4.5684585E−03 | 3.7767220E−04 |
| A4 | −5.2227148E−03 | −5.2635053E−03 | 2.7740776E−02 | 5.8118488E−02 |
| A5 | 6.8699058E−05 | −7.6433672E−04 | 1.9671707E−02 | −2.7708325E−02 |
| A6 | 1.0524034E−04 | 4.9156881E−05 | 4.7429657E−03 | 2.7770219E−02 |
| A7 | 5.8828712E−06 | 6.7869872E−05 | 1.1956495E−03 | 5.2798164E−02 |
| A8 | −2.4424967E−06 | −1.8042280E−06 | 4.4382448E−03 | 1.2063789E−02 |
| A9 | −8.8468824E−08 | 7.8568031E−08 | −1.9444600E−03 | −3.7810755E−02 |
| A10 | 4.2075402E−08 | −2.7139906E−07 | −1.5061066E−02 | −3.9427951E−02 |
| A11 | −5.4014777E−09 | −9.9755864E−08 | 1.1584369E−02 | −1.4178315E−03 |
| A12 | 2.7764560E−09 | −1.5143390E−08 | −6.7056176E−03 | 4.1981393E−02 |
| A13 | 3.8625505E−09 | 4.6341517E−09 | 8.3783926E−04 | 2.8874266E−02 |
| A14 | −2.4956801E−09 | 1.7538277E−09 | 1.7796847E−03 | −6.6166708E−03 |
| A15 | 5.0223970E−10 | −1.2617058E−09 | 3.1420314E−02 | −2.2411255E−02 |
| A16 | −3.6089758E−11 | 1.8806857E−10 | −2.8407592E−02 | 3.8658176E−03 |
| A17 | −2.2318116E−14 | 7.5179310E−12 | −1.1637750E−03 | −5.4688710E−03 |
| A18 | 5.8668226E−14 | 2.1559611E−12 | −9.6766879E−04 | −3.1481004E−03 |
| A19 | 2.3259212E−14 | 7.1352019E−14 | 1.3651322E−03 | 6.5893949E−04 |
| A20 | −3.8101803E−15 | −1.5558458E−13 | 1.3531295E−03 | 2.7648565E−03 |

Figure 3:
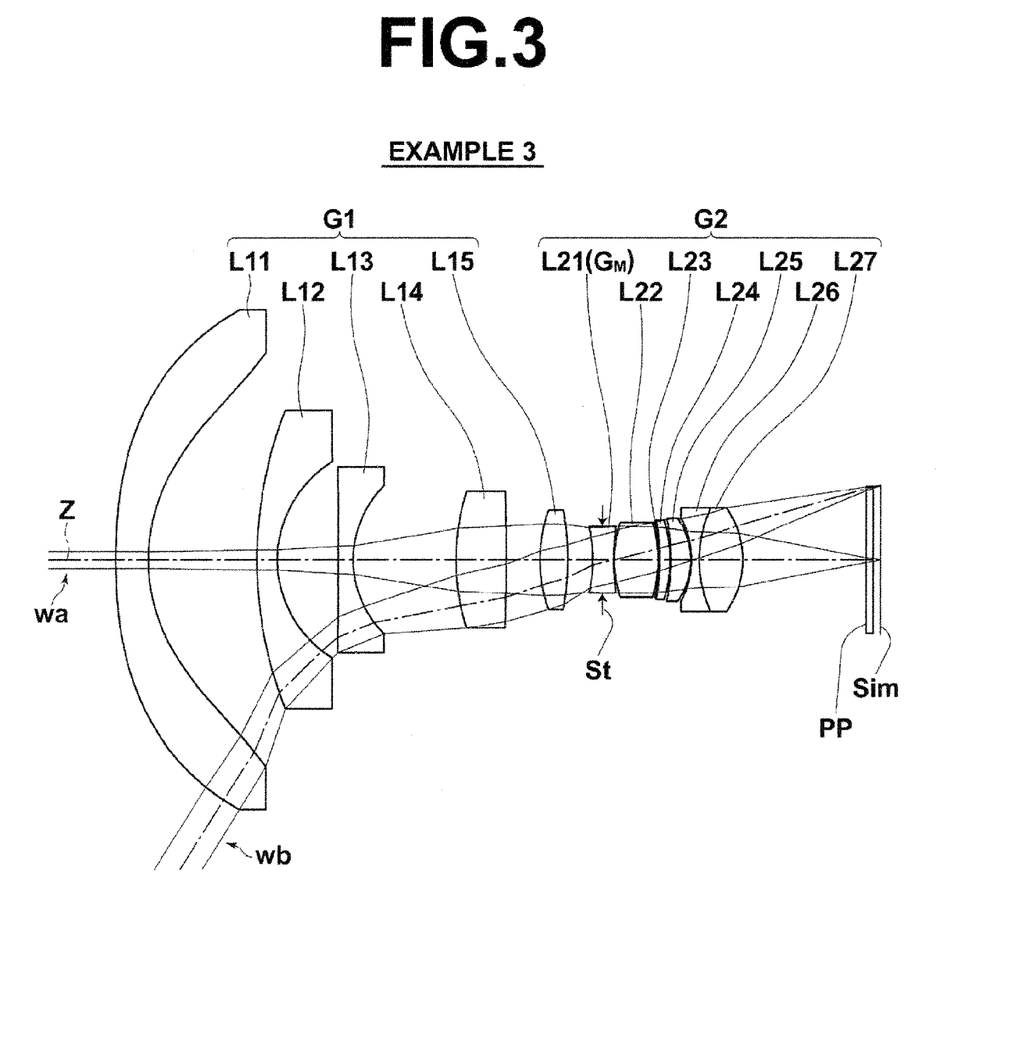
FIG. 3 is a cross-sectional view of a projection lens according to Example 3 of the present invention, illustrating the lens configuration thereof.

Next, a projection lens of Example 3 will be described. FIG. 3 shows a cross-sectional view of the projection lens according to Example 3, illustrating the lens configuration thereof.

Table 7 shows basic lens data of the projection lens of Example 3, Table 8 shows data regarding specs, Table 9 shows data regarding aspheric surface coefficients, and A through D of FIG. 6 show aberration diagrams.

TABLE 7

Example 3 • Lens Data

| Si (Surface Number) | Ri (Radius of Curvature) | Di (Surface Distance) | Ndj (Refractive Index) | vdj (Abbe Number) | EAi (Effective Beam Diameter) |
|---|---|---|---|---|---|
| *1 | 13.40685 | 0.69838 | 1.49100 | 57.58 | 11.02 |
| *2 | 4.02062 | 2.35611 | | | 9.11 |
| 3 | 9.09031 | 0.43949 | 1.70154 | 41.24 | 6.58 |
| 4 | 2.57109 | 1.32108 | | | 4.33 |
| 5 | −217.54041 | 0.32250 | 1.71299 | 53.87 | 4.10 |
| 6 | 2.31580 | 2.24074 | | | 3.27 |
| 7 | 5.14893 | 1.08266 | 1.64769 | 33.79 | 3.00 |
| 8 | −46.72931 | 0.72994 | | | 2.73 |
| 9 | 3.32718 | 0.59924 | 1.51742 | 52.43 | 2.18 |
| 10 | −6.22396 | 0.75385 | | | 1.99 |
| 11 (Aperture Stop) | ∞ | −0.21063 | | | 1.33 |
| 12 | −3.27422 | 0.45675 | 1.83481 | 42.73 | 1.43 |
| 13 | 5.68331 | 0.01442 | | | 1.45 |
| 14 | 2.79808 | 0.94086 | 1.68893 | 31.07 | 1.50 |
| 15 | −2.93453 | 0.01441 | | | 1.64 |
| *16 | −7.98237 | 0.02162 | 1.52500 | 53.00 | 1.66 |
| 17 | −4.75878 | 0.23043 | 1.51633 | 64.14 | 1.67 |
| 18 | −2.81917 | 0.01443 | | | 1.74 |
| 19 | −4.67340 | 0.43020 | 1.48749 | 70.23 | 1.76 |
| 20 | −1.59966 | 0.01442 | | | 1.83 |
| 21 | −1.92149 | 0.17297 | 1.80518 | 25.42 | 1.81 |
| 22 | 2.78255 | 0.94834 | 1.49700 | 81.54 | 2.03 |
| 23 | −1.98237 | 2.67233 | | | 2.28 |
| 24 | ∞ | 0.15135 | 1.51633 | 64.14 | 3.21 |
| 25 | ∞ | 0.16071 | | | 3.24 |

TABLE 8

Example 3 • Specs (d-line)

| | |
|---|---|
| f′ | 1.00 |
| Bf′ | 2.93 |

TABLE 8-continued

Example 3 • Specs (d-line)

| FNo. | 2.60 |
|---|---|
| 2ω [°] | 117.00 |

TABLE 9

Example 3 • Aspheric Surface Coefficient

| | Surface Number | | |
|---|---|---|---|
| | 1 | 2 | 16 |
| KA | 1.4334836E+00 | 1.6019717E−01 | −7.1878967E+00 |
| A3 | 1.0310370E−03 | 9.2934761E−04 | −8.2146326E−03 |
| A4 | 2.0003838E−03 | 1.5776029E−03 | −4.1941707E−02 |
| A5 | −2.0740629E−05 | 4.4658004E−06 | −6.4085479E−02 |
| A6 | −6.9900363E−05 | −5.9950050E−05 | 5.7503734E−02 |
| A7 | 3.5161937E−07 | 2.0900846E−07 | −1.7277512E−02 |
| A8 | 2.2232769E−06 | −5.3415354E−06 | −3.5941540E−02 |
| A9 | −5.1978151E−08 | 2.4204738E−08 | −4.2260560E−03 |
| A10 | 5.4134423E−08 | 1.3608183E−07 | 3.7596886E−02 |
| A11 | −2.2605146E−08 | 9.2563205E−09 | −5.0033081E−03 |
| A12 | 2.3284958E−09 | −1.1734975E−09 | −1.2043889E−02 |
| A13 | 5.1233179E−11 | −2.7159832E−11 | −3.7172159E−03 |
| A14 | −1.5472435E−10 | −5.0590780E−11 | 5.2047300E−03 |
| A15 | 4.5874587E−11 | −9.2891584E−12 | 8.9618892E−03 |
| A16 | −3.8050398E−12 | 3.3473860E−12 | −1.0653366E−02 |
| A17 | 0.0000000E+00 | 0.0000000E+00 | 0.0000000E+00 |
| A18 | 0.0000000E+00 | 0.0000000E+00 | 0.0000000E+00 |
| A19 | 0.0000000E+00 | 0.0000000E+00 | 0.0000000E+00 |
| A20 | 0.0000000E+00 | 0.0000000E+00 | 0.0000000E+00 |

Table 10 shows values corresponding to conditional expressions (1) through (6) of the projection lenses of Examples 1 through 3. Note that all embodiments apply the d-line as a reference wavelength, and the values shown in Table 10 are based on the reference wavelength.

TABLE 10

| Expression Number | Conditional Expression | Example 1 | Example 2 | Example 3 |
|---|---|---|---|---|
| (1) | 2ω | 117.38 | 117.10 | 117.01 |
| (2) | β$_P$ | 5.81 | 5.78 | 5.78 |
| (3) | |f$_M$/f$_F$| | 0.95 | 0.70 | 1.49 |
| (4) | |f$_M$/f$_R$| | 0.49 | 0.64 | 0.45 |
| (5) | |f/f$_M$| | 0.44 | 0.37 | 0.41 |
| (6) | h$_M$/f | 1.37 | 1.36 | 1.43 |

The data given below shows that all the projection lenses of Examples 1 through 3 satisfy conditional expressions (1) through (6), and have a wide angle and satisfactory characteristics of various aberrations while achieving a cost reduction and a compact size.

Figure 7:
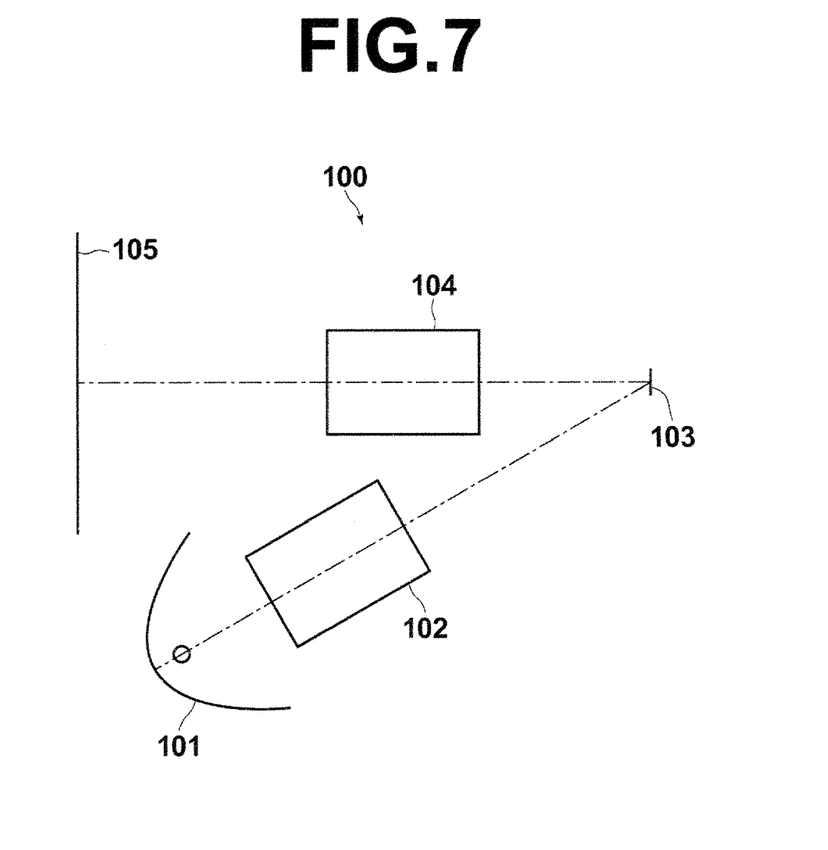
FIG. 7 is a schematic configuration diagram of a projection type display device according to an embodiment of the present invention.

Next, a projection type display device according to one embodiment of the present invention will be described with reference to FIG. 7. FIG. 7 schematically illustrates the configuration of a projection type display device 100 according to the present embodiment. This projection type display device 100 includes a light source 101, an illumination optical system 102, a DMD 103 as a light valve, and a projection zoom lens 104 according to an embodiment of the present invention.

Light beams emitted from the light source 101 are time-sequentially and selectively converted into each of the three primary colors (R, G, and B) of light by a color wheel (not shown), and light quantity distribution in the optical axis and a vertical cross section of the beams is made uniform by the illumination optical system 102 so that the beams are output to the DMD 103. The DMD 103 switches among modulation modes for colors of the incident light according to the switched color of the light. The light modulated by the DMD 103 enters the projection zoom lens 104. The projection zoom lens 104 projects the optical image formed by the light modulated by the DMD 103 onto the screen 105.

Note that various modifications to the projection type display device of the present invention from the device illustrated in FIG. 7 are possible. For example, the RGB colors can be simultaneously modulated by using three DMD's respectively corresponding to the colors of light, instead of employing a single DMD. In this case, a color separation/composition prism (not shown) is disposed between the projection zoom lens 104 and the DMD 103.

Note that other light valves may be used instead of the DMD 103. For example, transmissive liquid crystal display elements and reflection type liquid crystal display elements may be used as the light valve.

The present invention has been described with reference to the Embodiments and Examples. The present invention is not limited to the embodiments and the examples described above, and various modifications are possible. For example, values, such as the radius of curvature of each lens element, the distances between surfaces, the refractive indices, and the Abbe numbers, are not limited to the values in the numerical examples shown in the Tables, but may be other values.

Further, the projection type display device is also not limited to the configurations described above. For example, the light valves to be used and optical members used for the beam separation or beam composition are not limited to the above configurations, and various modifications are possible.

What is claimed is:

1. A projection lens that:
projects image information displayed at a reduction-side conjugate position onto a magnification-side conjugate position;
satisfies conditional expressions (1) and (2); and
satisfies conditional expressions (3) and (4) when a single lens which includes a surface having the smallest effective beam diameter or a cemented lens is designated as a reference lens, a system substantially consisting of lenses disposed closer to a magnification-side than the reference lens is designated as a front group, and a system substantially consisting of lenses disposed closer to a reduction side than the reference lens is designated as a rear group:

$$75 < 2\omega \quad (1)$$

$$\beta P < 10 \quad (2)$$

$$|fM/fF| < 2.0 \quad (3), \text{and}$$

$$|fM/fR| < 2.0 \quad (4),$$

where
ω: a half angle of view of the projection lens,
βP: a pupil magnification (a reduction-side pupil diameter/a magnification-side pupil diameter),
fM: the focal length of the reference lens,
fF is the focal length of the front group, and
fR is the focal length of the rear group.

2. The projection lens of claim 1, wherein the projection lens satisfies conditional expression (5) given below:

$$|f/fM| < 0.5 \quad (5),$$

where
f: the focal length of the entire projection lens system.

3. The projection lens of claim 1, wherein the projection lens satisfies conditional expression (6) given below:

$$0.7 < hM/f \quad (6),$$

where
hM: the effective beam diameter of a surface having the smallest effective beam diameter, and
f: the focal length of the entire projection lens system.

4. The projection lens of claim 1, wherein the front group has at least one aspheric surface.

5. The projection lens of claim 1, wherein the reference lens has a negative refractive power.

6. The projection lens of claim 1, wherein the rear group has at least one aspheric surface.

7. The projection lens of claim 1, wherein the rear group substantially consists of a negative lens, at least one positive lens, and a cemented lens composed of a negative lens and a positive lens, in this order from the magnification side.

8. The projection lens of claim 1, wherein the projection lens satisfies conditional expressions (1-1) and (1-2):

$$100 < 2\omega \quad (1\text{-}1), \text{ and}$$

$$\beta P < 7.5 \quad (2\text{-}1).$$

9. The projection lens of claim 1, wherein the projection lens satisfies conditional expressions (3-1) and (4-1):

$$|fM/fF| < 1.5 \quad (3\text{-}1), \text{ and}$$

$$|fM/fR| < 1.5 \quad (4\text{-}1).$$

10. The projection lens of claim 1, wherein the projection lens satisfies conditional expression (6-1) given below:

$$1.0 < hM/f \quad (6\text{-}1),$$

where
hM: the effective beam diameter of a surface having the smallest effective beam diameter, and
f: the focal length of the entire projection lens system.

11. A projection type display device comprising:
a light source;
a light valve which light from the light source enters; and
the projection lens of claim 1 which projects optical images generated by light modulated by the light valve onto a screen.

* * * * *